US008009651B2

(12) United States Patent  (10) Patent No.: US 8,009,651 B2
Bengtsson et al.  (45) Date of Patent: Aug. 30, 2011

(54) NEIGHBOURING DEVICE AIDING IN RECEIVING SETS OF DATA

(75) Inventors: Henrik Bengtsson, Lund (SE); Bo Larsson, Malmö (SE); Mats Lindoff, Lund (SE); Mats Blomberg, Täby (SE); Anders Östsjö, Björred (SE); Sten Minör, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 858 days.

(21) Appl. No.: 11/750,741

(22) Filed: May 18, 2007

(65) Prior Publication Data
US 2008/0285533 A1 Nov. 20, 2008

(51) Int. Cl.
*H04W 4/00* (2009.01)
(52) U.S. Cl. ........................ 370/340; 455/41.2
(58) Field of Classification Search .............. 455/41.2, 455/101, 115.3, 135, 161.1; 370/340
See application file for complete search history.

(56) References Cited

U.S. PATENT DOCUMENTS

| 2001/0018336 A1* | 8/2001 | Okajima et al. | 455/403 |
| 2005/0243756 A1* | 11/2005 | Cleveland et al. | 370/328 |
| 2006/0205433 A1* | 9/2006 | Sim et al. | 455/552.1 |
| 2007/0053333 A1* | 3/2007 | Pragada | 370/338 |

FOREIGN PATENT DOCUMENTS

| EP | 1 113 592 A2 | 7/2001 |
| EP | 1 592 185 A1 | 11/2005 |

OTHER PUBLICATIONS

International Search Report and Written Opinion issued in corresponding international application No. PCT/EP2007/062379, mailed Feb. 29, 2008, 12 pages.

* cited by examiner

*Primary Examiner* — Jinsong Hu
*Assistant Examiner* — Michael Nguyen
(74) *Attorney, Agent, or Firm* — Harrity & Harrity, LLP

(57) ABSTRACT

According to one embodiment, a first wireless communication device may receive a data file via a first wireless network interface, determine if the whole file has been properly received, receive at least the data of the file that have not been properly received via the first wireless interface from a neighboring second wireless communication device and combine the data received via the first wireless network interface with data received from the neighboring wireless communication device in order to obtain the complete file. The second wireless communication device may also receive the data file via a second wireless network interface and send at least the data of the file that have not been properly received over a neighbor device interface.

12 Claims, 3 Drawing Sheets

NEIGHBOURING DEVICE AIDING IN RECEIVING SETS OF DATA

TECHNICAL FIELD

Embodiments disclosed herein may relate to the field of receiving data in a wireless communication terminal via a wireless network. More particularly, embodiments disclosed herein may relate to a method, wireless communication device, or a computer program product for receiving data in a first wireless communication device via a first wireless network interface as well as to a method, wireless communication device, or a computer program product for aiding a neighboring wireless communication device to receive a set of data via a first wireless network interface of the neighboring device.

DESCRIPTION OF RELATED ART

Portable communication devices, such as cellular phone, may include various media playing functionalities. Content may be download to the device via a wireless network.

When downloading data to a portable communication device, like a cellular phone, the rate at which such data is downloaded may be dependent on the quality of the link between the device and the network, which link quality may be determined as bit error rate (BER). This BER may determine the chip rate. The chip rate in a wireless system may be the rate at which chips (e.g., zeros or ones) are sent. Several chips may be used to code the actual information, e.g., the bits. With fewer chips per bit, a higher speed may be achieved. In a system with low BER just a few chips may code a bit. But with a high BER, several chips may code a bit. If the connection to a wireless network is poor, and the BER is high, downloading of a file may take longer than otherwise.

In antenna diversity, a wireless communication device may include several antennas and the antenna that has the best reception quality may be selected for transferring or receiving data. However, portable communication devices may be small and in case one device is provided with several such antennas, these may be provided very close to each other. This also may mean that the link quality experienced by one such antenna may not differ appreciably from that experienced by the other antenna in the device. The provision of an additional antenna may lead to additional costs and a larger size of the device, which may be undesirable.

In wireless networks such as WCDMA networks, a cellular phone communicates with several base stations in a network and the system may hand over the phone to the base station that has the best link quality.

SUMMARY

Embodiments disclosed herein may provide assisted reception of a set of data for wireless communication devices.

A first aspect may concern a method for receiving a set of data in a first wireless communication device via a first wireless network interface. The method may include: receiving data of the set of data via the first wireless network interface, determining if the whole set of data has been properly received, receiving at least the data of the set of data that have not been properly received via the first wireless interface from at least one neighboring wireless communication device via a neighbor device interface, which neighboring wireless communication device has received said set of data via a second wireless network interface associated with this neighboring device, and combining the data of the set of data received via the first wireless network interface with data of the set of data received from the neighboring wireless communication device in order to obtain the complete set of data.

A second aspect may include the features of the first aspect, and may include sending a request to the at least one neighboring wireless communication device to aid in the reception of the set of data using the second wireless network interface.

A third aspect may include the features of the second aspect, and may include sending reception enabling data to the second wireless communication device.

A fourth aspect may include the features of the first aspect, and may include sending link quality data over the first wireless network interface indicating a better link quality than the one that exists over this interface.

A fifth aspect may include the features of the fourth aspect, wherein data of the set of data received over the first wireless network interface may be received with a quality corresponding to the indicated link quality.

A sixth aspect may include the features of the first aspect, and may include sending data over the first wireless network interface indicating that assistance may be obtained from at least one neighboring wireless communication device in receiving the set of data.

A seventh aspect may include the features of the first aspect, and may include requesting the neighboring wireless communication device to supply data that has not been properly received via the first wireless network interface and receiving data of the set of data from the neighboring wireless communication device may include only receiving data not properly received via the first wireless interface.

An eighth aspect may include the features of the first aspect, wherein receiving data of the set of data from the neighboring wireless communication device may include receiving the whole set of data that the neighboring wireless communication device has received via said second wireless network interface and may include selecting data received from the neighboring wireless communication device corresponding to data of the set of data that have not been properly received via the first wireless interface for use in combining.

A ninth aspect may concern a wireless communication device. The device may include: a first wireless network interface associated with a wireless wide area network, a neighbor device interface for interfacing with neighboring wireless communication devices, a network communication unit for communicating over the first wireless network interface, a neighbor communication unit for communication with neighboring wireless communication devices via the first neighbor device interface, and a control unit configured to receive data of the set of data via the first wireless interface, determine if the whole set of data has been properly received, at least receive the data of the set of data that have not been properly received via the first wireless network interface from at least one neighboring wireless communication device via the neighbor device interface, which neighboring wireless communication device has received said set of data via a second wireless network interface associated with this neighboring device, and combine the data of the set of data received via the first wireless network interface with data of the set of data received from the neighboring wireless communication device in order to obtain the complete set of data.

A tenth aspect may include the features of the ninth aspect, wherein the control unit may be configured to send a request to said at least one neighboring wireless communication device to aid in the reception of the set of data using said second wireless network interface associated with this neighboring device.

An eleventh aspect may include the features of the tenth aspect, wherein the control unit may be configured to send reception enabling data to the second wireless communication device.

A twelfth aspect may include the features of the ninth aspect, wherein the control unit may be configured to send link quality data over the first wireless network interface indicating a better link quality than the one that exists over this interface.

A thirteenth aspect may include the features of the twelfth aspect, wherein data of the set of data received over the first wireless network interface are received with a quality corresponding to the indicated link quality.

A fourteenth aspect may include the features of the ninth aspect, wherein the control unit may be configured to send data over the first wireless network interface indicating that assistance is obtained from at least one neighboring wireless communication device in receiving the set of data.

A fifteenth aspect may include the features of the ninth aspect, wherein the control unit may be configured to request the neighboring wireless communication device to supply data that has not been properly received via the first wireless network interface and when receiving data of the set of data from the neighboring wireless communication device only to receive data not properly received via the first wireless interface.

A sixteenth aspect may include the features of the ninth aspect, wherein said control unit when receiving data of the set of data from the neighboring wireless communication device is configured to receive the whole set of data that the neighboring wireless communication device has received via said second wireless network interface and may be configured to select data received from the neighboring wireless communication device corresponding to data of the set of data that have not been properly received via the first wireless interface for use in combining.

A seventeenth aspect may include the features of the ninth aspect, wherein the device may be a portable communication device.

An eighteenth aspect may include the features of the seventeenth aspect, wherein the device may be a cellular phone.

A nineteenth aspect may include the features of the ninth aspect, wherein the device may be a base station of a wireless network.

A twentieth aspect may concern a computer program product for receiving a set of data in a first wireless communication device via a first wireless network interface to a wireless wide area network. The computer program may include: computer program code, configured to make the wireless communication device perform, when said program code is loaded in the wireless communication device, receive data of the set of data via the first wireless interface, determine if the whole set of data has been properly received, at least receive the data of the set of data that have not been properly received via the first wireless network interface from the at least one neighboring wireless communication device via the neighbor device interface, which neighboring wireless communication device has received said set of data via a second wireless network interface associated with this neighboring device, and combine the data of the set of data received via the first wireless network interface with data of the set of data received from the neighboring wireless communication device in order to obtain the complete set of data.

A twenty-first aspect concerns a method, in a wireless communication device, for aiding a neighboring wireless communication device to receive a set of data via a first wireless network interface of the neighboring device. The method may include: receiving data of the set of data via a second wireless network interface, and sending at least data of the set of data that have not been properly received by the neighboring wireless communication device via the first wireless interface over a neighbor device interface, in order to allow the neighboring wireless communication device to combine data of the set of data that it has received via the first wireless network interface with data of the set of data supplied by the wireless communication device for obtaining the complete set of data.

A twenty-second aspect may include the features of the twenty-first aspect, and may include receiving a request to aid in the reception of the set of data from the neighboring wireless communication device.

A twenty-third aspect may include the features of the twenty-first aspect, and may include receiving reception enabling data from the neighboring wireless communication device and may use this reception enabling data when receiving data of the set of data via a second wireless network interface.

A twenty-fourth aspect may include the features of the twenty-first aspect, and may include receiving, from the neighboring wireless communication device, a request to supply data that has not been properly received via the first wireless network interface and sending data of the set of data may include only sending requested data.

A twenty-fifth aspect may include the features of the twenty-first aspect, wherein sending data of the set of data may include sending all received data in the set of data to the neighboring wireless communication device.

A twenty-sixth aspect concerns a wireless communication device for aiding a neighboring wireless communication device to receive a set of data via a first wireless network interface of the neighboring device. The wireless communication device may include: a second wireless network interface associated with a wireless wide area network, a neighbor device interface for interfacing with neighboring wireless communication devices, a network communication unit for communicating over the second wireless network interface, a neighbor communication unit for communication with neighboring wireless communication devices via the neighbor device interface, and a control unit configured to receive data of the set of data via the second wireless network interface, and send at least data of the set of data that have not been properly received by the neighboring wireless communication device via the first wireless interface over the neighbor device interface, in order to allow the neighboring wireless communication device to combine data of the set of data that it has itself received via the first wireless network interface with data of the set of data supplied from the wireless communication device for obtaining the complete set of data.

A twenty-seventh aspect may include the features of the twenty-sixth aspect, wherein the control unit is further configured to receive a request to aid in the reception of the data file from the neighboring wireless communication device.

A twenty-eighth aspect may include the features of the twenty-sixth aspect, wherein the control unit may be configured to receive reception enabling data from the neighboring wireless communication device and order the network communicating unit to use this reception enabling data when receiving data of the set of data via a second wireless network interface.

A twenty-ninth aspect may include the features of the twenty-sixth aspect, wherein the control unit may be configured to receive from the neighboring wireless communication device a request to supply data that has not been properly received via the first wireless network interface and when being configured to send data of the set of data is configured to only send requested data.

A thirtieth aspect may include the features of the twenty-sixth aspect, wherein it is a portable communication device.

A thirty-first aspect may include the features of the thirtieth aspect, wherein the device may be a cellular phone.

A thirty-second aspect may include the features of the twenty-sixth aspect, wherein the device may be a base station.

A thirty-third aspect concerns a computer program product for aiding a neighboring wireless communication device to receive a set of data via a first wireless network interface of the neighboring device. The computer program product may include: computer program code, configured to make the wireless communication device execute, when said program code is loaded in the wireless communication device, receive data of the set of data via a second wireless network interface, and send at least data of the set of data that have not been properly received by the neighboring wireless communication device via the first wireless interface over a neighboring device interface, in order to allow the neighboring wireless communication device to combine data of the set of data that it has itself received via the first wireless network interface with data of the set of data supplied from the wireless communication device for obtaining the complete set of data.

It should be emphasized that the term "comprises/comprising" and "include/including" when used in this specification is taken to specify the presence of stated features, steps or components, but does not preclude the presence or addition of one or more other features, steps, components or groups thereof.

BRIEF DESCRIPTION OF THE DRAWINGS

Embodiments will now be described in more detail in relation to the enclosed drawings, in which.

DETAILED DESCRIPTION OF EMBODIMENTS

One embodiment may be directed to assisting a wireless communication terminal in receiving a set of data, for example, a data file, such as an MP3 file.

Figure 1:
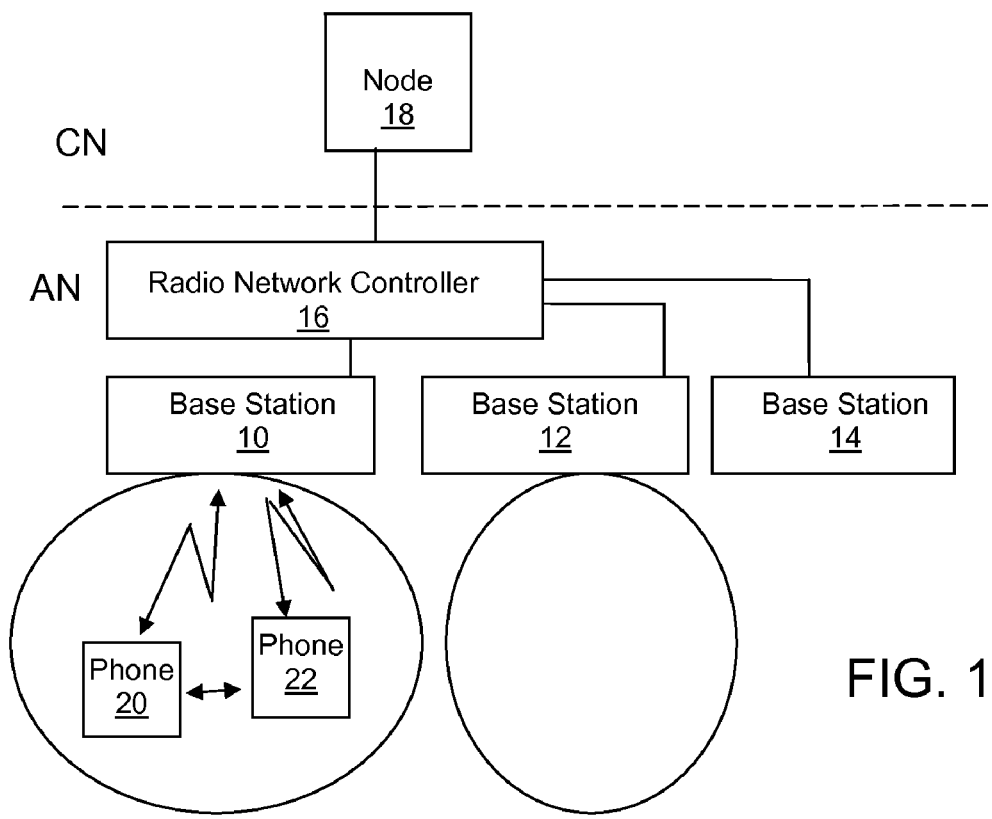
FIG. 1 schematically shows an exemplary access network connected to a core network as well as two cellular phones connected to a base station of the access network.

One embodiment will now be described in more detail in the non-limiting example context of a wireless wide area network, which may be a Universal Mobile Telecommunications (UMTS) network that is shown in FIG. 1. Embodiments may not limited to UMTS but may, for example, also be applied in LTE (Long Term Evolution) GSM (Global System for Mobile Communications) and CDMA (Code Division Multiple Access) networks. A core network CN has a first service node 18, which may be a General Packet Radio Service (GPRS) node tailored to provide packet-switched type services, which may be referred to as the serving GPRS service node (SGSN). The node 18 may be connected to connectionless-oriented networks such as the Internet. The core network CN may include other types of service nodes, such as a circuit-switches type of service node.

The core network service node 18 connects to an access network AN, which may be a UMTS Terrestrial Radio Access Network (UTRAN). UTRAN AN may include one or more radio network controllers (RNC), where only one RNC 16 is shown in FIG. 1. The RNC 16 may be connected to a plurality of base stations. The RNC 16 may be connected to a first base station 10, a second bas station 12 and a third base station 14. Each of these base stations 10, 12 and 14 may control communication within a cell. One base station may handle more than one cell. In the figure, only two cells are shown, one associated with the first base station 10 and one associated with the second base station 12 (shown as empty). The cells may be provided in a geographical area covered by the access network AN. In FIG. 1 two user equipment units in the form of a first and a second cellular phone 20 and 22 are shown in the cell handled by the base station 10 in the access network AN and shown as communicating with this base station 10. They are also shown as communicating with each other. There may be provided several cellular phones communicating with a base station. The nature of the communication is described below in more detail.

The cellular phones 20 and 22 may both be wireless communication devices and may be portable communication devices. One such device that is applicable for both the first and second wireless communication devices 20 and 22 is shown in a front view in FIG. 2. In one embodiment, the device is a cellular phone 20, 22 and may be provided with a display 26, 40 and a user input unit in the form of a keypad 24, 38 including a number of keys. It may include other units like speakers and microphones as well (not shown). The keypad 24, 38 is used for entering information such as selecting of functions and responding to prompts and the display 26, 40 may be used for displaying functions and prompts to a user of the phone. A cellular phone may be just one example of a type of wireless communication device that may be a portable communication device in which an embodiment may be implemented. One embodiment may, for example, also be used in other portable communication devices, such as in a PDA (personal digital assistant), a palm top computer, a lap top computer or a media player, e.g., a device having the ability to communicate via the wireless network.

Figure 3:
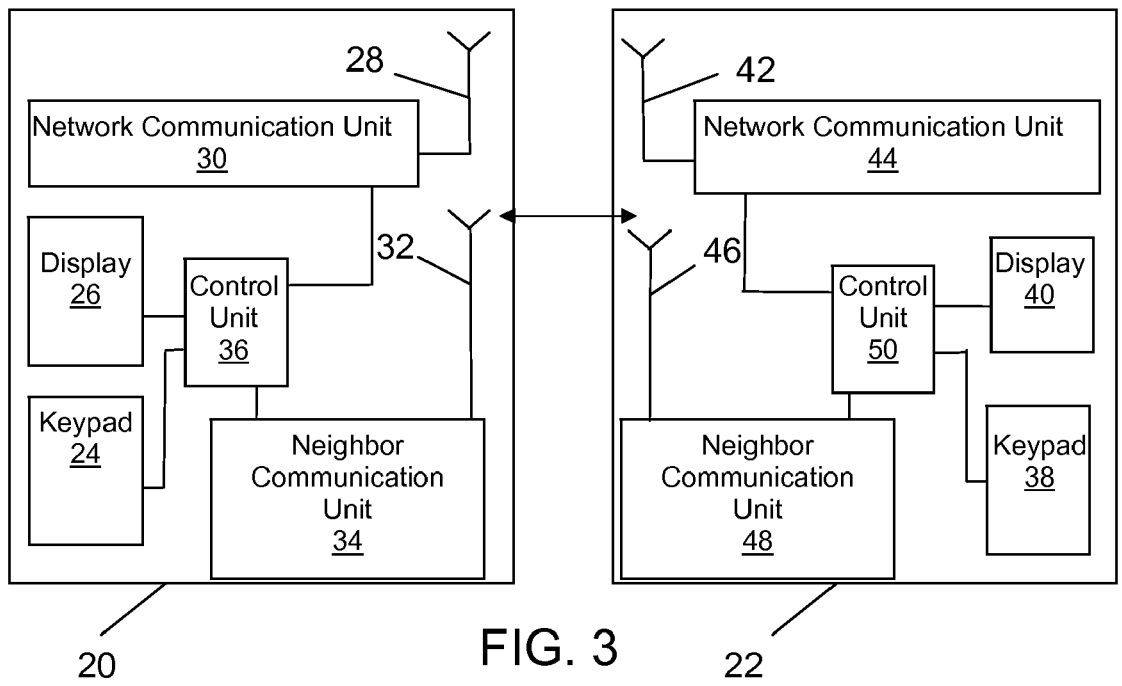
FIG. 3 shows a block schematic of exemplary parts of the two cellular phones in one embodiment.

FIG. 3 shows an exemplary block schematic of the first and second portable communication devices, 20 and 22. They each may include the above described user keypads 24 and 38 as well as displays 26 and 40. These entities 24 and 26 are in the first phone 20 connected to a first control unit 36 and in the second phone 22 they 38 and 40 are connected to a second control unit 50. The first control unit 36 may be connected to a first network communication unit 30 and to a first neighbor communication unit 34. The first network communication unit 30 may be connected to an first wireless network interface in the form of a first antenna 28 and the first neighbor communication unit 34 may be connected to a first neighbor device interface 32 for communication with neighboring wireless communication devices, of which the second cellular phone 22 is one. The first network communication unit 30 may be a radio communication unit, for example, in the form of an ASIC circuit including functionality for communication in the wireless network, such as modulators, demodulators, power amplifiers etc. The neighbor communication unit 34 in this embodiment may include a Bluetooth communication unit and the neighbor device interface 32 may include a Bluetooth antenna. In the same way, the second control unit 50 may be connected to a second network communication unit 44 and to a first neighbor communication unit 48. The second network communication unit 44 may be connected to a second wireless network interface in the form of a third antenna 42 and the second neighbor communication unit 48 may be connected to a second neighbor device interface 46 for communication with neighboring wireless communication devices and for communicating with the first cellular phone 20. Also the second network communication unit 44 is a radio communication unit, which may be of the same type as the first network communication unit 30, while the neighbor communication unit 48 may also be a Bluetooth communication unit and the neighbor device interface 46 may also be a Bluetooth antenna. It should here be realized that the neighbor communication units and interfaces can be provided in other ways. If, for example, the first phone 20 is provided with a system connector, which may be used for interconnecting the phones, this may, as an alternative, be used. It may also possible to use other ways of providing neighbor communication such as using IR or even a local network like via a LAN or WLAN network. The neighbor communication units and neighbor device interfaces can thus have a number of different configurations depending on how neighboring devices are able to communicate with each other. The phones may include radio communication units and antennas adapted to communicate according to the communication standard provided by the wireless wide area network.

Figure 2:
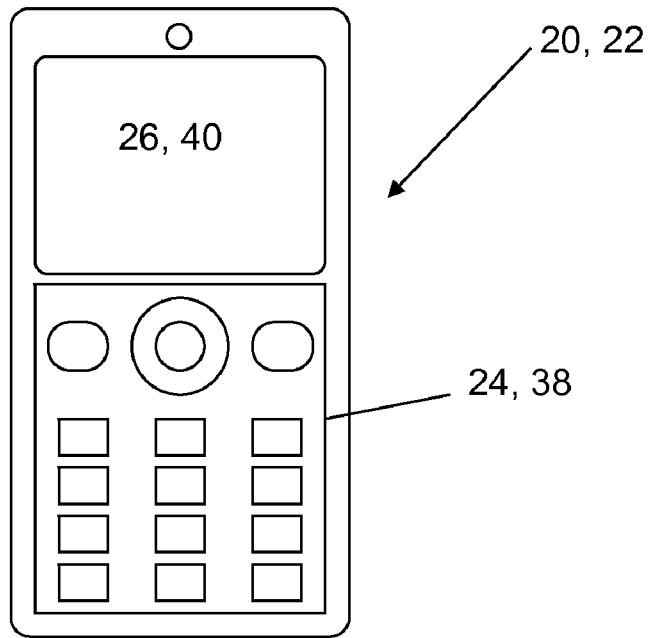
FIG. 2 shows a front view of an exemplary wireless communication device according to one embodiment in the form of a cellular phone.
Figure 5:
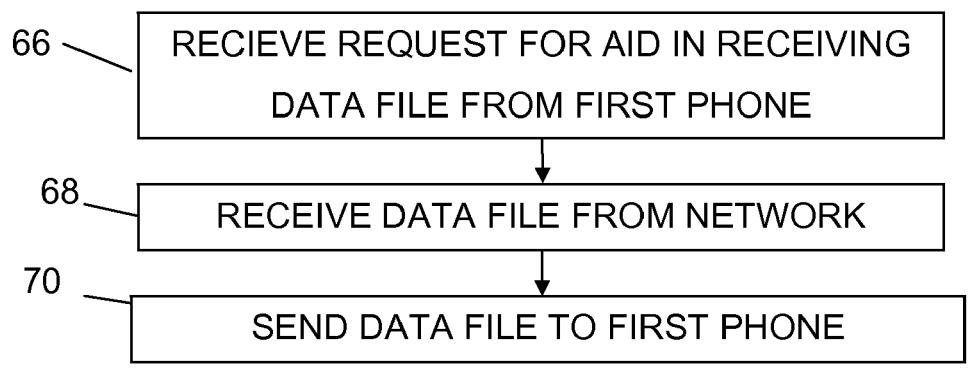
FIG. 5 shows a flow chart of an exemplary process for aiding a wireless communication device to receive a set of data in one embodiment.
Figure 4:
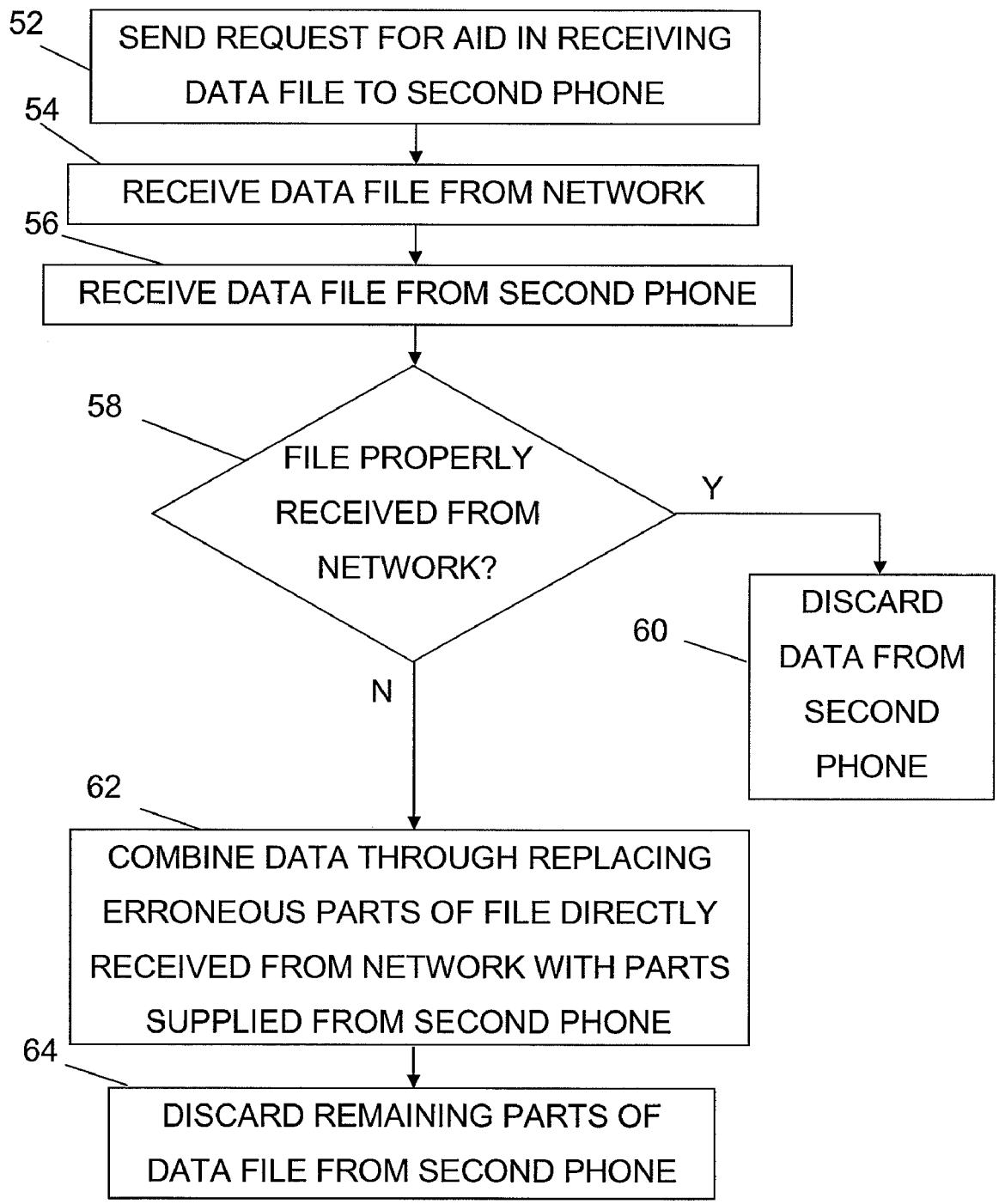
FIG. 4 shows a flow chart of an exemplary process for receiving a set of data in one embodiment.

One embodiment is described below in relation to previously described FIGS. 1 to 3 as well as to FIG. 4, which shows a flow chart of an exemplary process for receiving a set of data provided in the first phone in one embodiment, and to FIG. 5, which shows a flow chart of an exemplary process for aiding a wireless communication device to receive a set of data performed in the second phone in one embodiment.

The process may start with the user of the first phone 20 wanting to download a set of data, for example, in the form of a data file, e.g., a media file like an MP3 file. It may be possible that the link quality between the first phone 20 and the first base station 10 is poor, but the link quality between the first phone 20 and the other base stations 12 and 14 are even poorer. This may mean that a file download from a server accessed via the wireless wide area network may take a long time.

In one embodiment, a neighbor assisting download function may be provided by the first control unit 36 of the first phone 20 and presented to a user of the phone 20 via the display 26. The user of the phone 20 may then select the function using the keypad 24. If the function is selected, the user may be presented with a list of one or more neighboring phones that may be contacted. This may be done through detecting, via the neighbor device interface 32, which devices are close by, or through looking in a pre-determined list, which list may have been set by the user beforehand. In one embodiment, the user may select terminals himself and enter data regarding them. He may also, if the users of them are close by, see which cellular phones are located in the neighborhood. In one embodiment, the selection of such neighboring devices may be automatic.

Once one or more such neighboring devices have been selected, the control unit 36 may order the neighbor communication unit 34 to send a request for aid in receiving a set of data, which here may be exemplified by a data file (block 52). This request may be sent to the second phone 22. The request may be sent using an instant message via the neighbor device interface 32 to all or some neighboring devices. It may also be sent as a message via the wide area network. The request may be received (block 66) in, for example, the second phone 22, via the neighbor device interface 46 and neighbor communication unit 48 of the second phone 22, and forwarded to the second control unit 50 of the second phone 22. The second control unit then may start a neighbor assisting download client function, where the request may be presented to the user of the second phone 22, which may accept or decline. The answer may then be sent, possibly using the same route back to the control unit 36 of the first phone 20. In this way several responses from neighboring phones may be received by the first phone 20. If no neighboring phone accepts, the first control unit 36 may go on and download a file unassisted in conventional manner. All phones that do decline may take no part in the assisted downloading, while phones that accept may take such part. In this exemplary embodiment, the second phone 22 may have accepted to take part in the downloading.

It may be possible that the data file is broadcast from the network. This may be done through the first phone 20 requesting a specialized file transfer from the network. In this case the second phone 22 may be able to receive the data file from the network without any special measures being performed. The data file may also be downloaded on a traffic connection dedicated to the first phone 20. In this case, the first control unit 36 may retrieve reception-enabling data from the first network communicating unit 30, such as encryption and coding keys used and other suitable data enabling the second phone 22 to receive data destined for the first phone 20. If such reception enabling data is retrieved from the first network communicating unit 30, it may then be sent to the second phone 22 via the neighbor communication unit 34 and the neighbor device interface 32. In one embodiment, it may be possible that such data is not available until the service has been initiated via the network.

The first phone 20 may to download a file from a server via the network. The file may be, in such downloading, transferred from the server via the core network and access network to the first phone 20 via the first base station 10. The file may be received by the first control unit 36 via antenna 28 and network communicating unit 30 (block 54). The file may, at the same time, be received by the second control unit 50 of the second phone 22 via the antenna 42 and the second network communicating unit 42 (block 68). The whole file may thus be received by both the phones 20 and 22. The second control unit 50 of the second phone 22 may send, in this embodiment, the whole copy of the file that it receives via the neighbor communicating unit 48, antenna 46, antenna 32 and neighbor communicating unit 34 to the first control unit 36 (block 70). In this way the first control unit 36 may receive the whole copy from the second phone (block 56). The first control unit 36 then checks the copy of the file that it itself directly receives from the network. In case the whole file was received properly (block 58), the copy it receives from the second phone 22 may be discarded (block 60). However, if it was not, e.g. if some blocks or sections are missing or full of errors, the first control unit 36 may combine the two copies of the files through replacing the erroneous or missing parts of the directly received file with the corresponding parts received from the second phone 22 (block 62). The remaining parts of the file received from the second phone 22 may be discarded (block 64).

In this way it may be possible for the first phone to receive a file even though the link quality is poor. In this case, the second phone may have better reception quality.

One embodiment may allow a higher rate of transferring a set of data to a wireless communication device, than what may be allowed otherwise. In one embodiment, a wireless communication device may be assisted by neighboring devices and may correct any deficient parts of the set of data it itself receives. One embodiment may be implemented at low cost without any substantial changes to the hardware of the wireless communication device by using already existing units.

A wireless communication device, when communicating with the network, may signal the link quality, and that link quality may be used for the data transfer. This link quality may be the BER, which directly influences the speed with which a file is downloaded. It may be possible that the first phone informs the network of the fact that the file transfer is a neighbor assisted file transfer and perhaps the number of neighboring terminals that are assisting in the downloading of the file. In this case the network may assume a different lower BER than what is being signaled and therefore the file transfer may be speeded up. As an alternative, it may be possible that the functionality provided by the first control unit 36 considers the number of neighboring devices that assist in the file transfer and then orders the first network communicating unit 30 to adjust the BER that it reports to the network accordingly, e.g., that it reports a lower BER than it actually perceives, in order to take account of the fact that it may get assistance. By allowing a higher BER, it may be possible to receive the data file at a higher speed. In practice it may mean that the network codes the data using fewer chips per bit. Thereby, the first phone may receive data with a higher BER. The second phone may also receive data with a higher BER. By combining these two streams with a higher BER, a bit stream with acceptable error rate may be obtained.

It may be possible to modify the above described embodiments. It may be possible that the first control unit analyses the data it receives first and only requests the neighboring phone to supply data it has not properly received. This request may be sent over the neighbor device interface. The second phone then replies by only sending the requested data and nothing else, which may be combined with the correctly receive parts of the file in the first phone. Here, it may be possible that the combining may be made fairly infrequently, e.g. once every second.

In one embodiment, different parts of the data set may be sent to the portable communications device and the neighboring device. The portable communications device may receive the part of the data set from the neighboring device and combine the parts to form the full data set.

It should be realized that embodiments may not limited to file download. Embodiments may be applied for file upload. In this case, it may be possible that the first and second base stations 10 and 12 of FIG. 1 use the same principles for combining a data file uploaded from, for example, the first phone 20. Thus, in this case, the wireless communication devices may be base stations.

Figure 6:
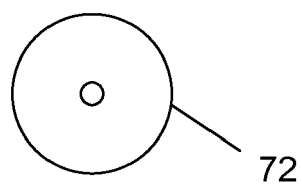
FIG. 6 shows an exemplary CD ROM disc on which program code for executing a method in one embodiment.

The control units in the phones according one embodiment may be provided in the form of one or more processors with corresponding memory containing the program code for performing the functions of these units. This program code can also be provided on one or more computer program products such as a CD ROM disc 72 as depicted in FIG. 6, which may perform a method consistent with one embodiment when loaded into a phone having suitable processing capabilities. Naturally other types of products can be provided for this, such as, for example, a removable memory like a memory stick. The computer program product can also be provided as software, which is downloaded remotely from a server either outside or inside the cellular network or be downloaded via a computer like a PC to which the phone is temporarily connected.

In one embodiment, a higher rate of transferring a set of data to a wireless communication device may be achieved. In one embodiment, the wireless communication device may get assisted by neighboring devices and may correct any deficient parts of the set of data it itself receives. In one embodiment, diversity may be implemented at low cost without any substantial changes to the hardware of such a device.

In one embodiment, multiple antennas may be provided on one portable communications device. One embodiment may exploit antenna diversity functionality for the reception, e.g., for small-sized portable communication devices.

There are a number of further variations that can be made to the embodiments described in addition to those already mentioned. It may be, for example, possible that a request for aid is not sent to a neighboring device, but that the users of the two devices talk to each other and exchange information for assisted downloading. The user of the second wireless device may then manually enter information or start a neighbor assisting download client function, which may then receive the file in parallel with the requesting device and send the relevant parts of this file to the requesting device.

Although the present invention has been described in connection with specific embodiments, it is not intended to be limited to the specific form set forth herein. Rather, the scope of the present invention is limited only by the accompanying claims.

The invention claimed is:

1. A method for receiving, from a server in a network, a set of data at a first wireless communication device via a base station connected to the network, the method comprising:
    detecting, via a Bluetooth-enabled or infrared-enabled interface of the first wireless communication device, at least one second wireless communication device within a communication area associated with the base station;
    sending, via the Bluetooth-enabled or infrared-enabled interface, a request to the at least one second wireless communication device to obtain the set of data from the server via the base station;
    receiving, via the Bluetooth-enabled or infrared-enabled interface, an acceptance of the request, by a number of the at least one second communication device;
    sending, over the network, an indication of the number of the at least one second communication device to obtain the set of data from the server via the base station;
    sending link quality data over a wireless network interface indicating a link quality based on the number of the at least one second communication device, where the indicated link quality is different than a link quality associated with the wireless network interface;
    receiving, first data, of the set of data, transferred from the base station, via the wireless network interface of the first wireless communication device, wherein a transfer rate associated with the first data is based on the indication of the number of the at least one second communication device, and where the received first data is transferred from the base station with a quality corresponding to the indicated link quality;
    determining that the first data does not include an entirety of the set of data;
    receiving at least second data, of the set of data, forwarded from the number of the at least one second wireless communication device via the Bluetooth-enabled or infrared-enabled interface; and
    combining the first data with the second data to obtain the entirety of the set of data.

2. The method according to claim 1, further comprising:
sending, via the Bluetooth-enabled or infrared-enabled interface, reception enabling data to the number of the at least one second wireless communication device, wherein the reception enabling data includes one of encryption data or coding keys for the set of data.

3. The method according to claim 1, wherein the second data differs from the first data, the method further comprising:
requesting the number of the at least one second wireless communication device to provide the second data without data corresponding to the first data, of the set of data, to the first wireless communication device.

4. The method according to claim 1, wherein receiving the second data, of the set of data, from the number of the at least one second wireless communication device comprises receiving the entirety of the set of data.

5. A wireless communication device comprising:
a wireless network interface associated with a base station connected to a wireless wide area network (WAN),
a Bluetooth-enabled or infrared-enabled interface for interfacing with neighboring wireless communication devices,
a network communication unit for communicating over the first wireless network interface,
a neighbor communication unit for communication with neighboring wireless communication devices via the Bluetooth-enabled or infrared-enabled interface, and
a control unit configured to:
  detect, via the Bluetooth-enabled or infrared-enabled interface, at least one neighboring wireless communication device within a communication area associated with the base station,
  send, via the Bluetooth-enabled or infrared-enabled interface, a request to the at least one neighboring wireless communication device to obtain the set of data from the wireless WAN via the base station,
  receive, via the Bluetooth-enabled or infrared-enabled interface, an acceptance, of the request, by a number of the at least one neighboring communication device,
  send, over the wireless WAN, an indication of the number of the at least one neighboring communication device to obtain the set of data from the wireless WAN via the base station,
  send, over the wireless network interface, link quality data that indicates a link quality that is based on the number of the at least one neighboring communication device, where the indicated link quality is different than a link quality that exists over the wireless network interface;
  receive first data, of the set of data, transferred from the base station, via the wireless network interface of the first wireless communication device, wherein a transfer rate associated with the first data is based on the indication of the number of the at least one neighboring communication device, and where the received first data is transferred from the base station with a link quality that corresponds to the indicated link quality;
  determine that the first data does not include an entirety of the set of data,
  receive at least second data, of the set of data, forwarded from the number of the at least one neighboring wireless communication device via the Bluetooth-enabled or infrared-enabled interface, and
  combine the first data with the second data to obtain the entirety of the set of data.

6. The wireless communication device according to claim 5, wherein the control unit is further configured to send, via the Bluetooth-enabled or infrared-enabled interface, reception enabling data to the number of the at least one neighboring wireless communication device, wherein the reception enabling data includes one of encryption data or coding keys for the set of data.

7. The wireless communication device according to claim 5, wherein the second data differs from the first data and the control unit is further configured to request the number of the at least one neighboring wireless communication device to provide the second data without data corresponding to the first data, of the set of data, to the wireless communication device.

8. The wireless communication device according to claim 5, wherein said control unit, when receiving the second data, of the set of data, from the number of the at least one neighboring wireless communication device, is configured to receive the entirety of the set of data.

9. The wireless communication device according to claim 5, wherein the wireless communication device is a portable communication device.

10. The wireless communication device according to claim 9, wherein the wireless communication device is a cellular phone.

11. The wireless communication device according to claim 5, wherein the wireless communication device is a base station of a wireless WAN.

12. A computer program product for receiving, from a server in a network, a set of data at a first wireless communication device via a base station connected to a wireless wide area network, comprising:
computer software, configured to make the wireless communication device perform, when said software is executed by the first wireless communication device,
  detect, via a Bluetooth-enabled or infrared-enabled interface of the first wireless communication device, at least one second wireless communication device within a communication area associated with the base station,
  send, via the Bluetooth-enabled or infrared-enabled interface, a request to the at least one second wireless communication device to obtain the set of data from the server via the base station,
  receive, via the Bluetooth-enabled or infrared-enabled interface, an acceptance, of the request, by a number of the at least one second communication device,
  send, over the network, an indication of the number of the at least one second communication device to obtain the set of data from the server via the base station,
  send link quality data over the wireless network interface indicating a link quality based on the number of the at least one second communication device, where the indicated link quality is different than a link quality associated with the wireless network interface;
  receive first data, of the set of data, transferred from the base station, via a wireless interface, where the received first data is transferred from the base station with a quality corresponding to the indicated link quality;
  determine that the first data does not include an entirety of the set of data,
  receive at least second data, of the set of data, forwarded from the number of the at least one second wireless communication device via the Bluetooth-enabled or infrared-enabled interface, and
  combine the first data with the second data to obtain the entirety of the set of data.

* * * * *